UNITED STATES PATENT OFFICE.

HENRY V. DUNHAM, OF NEW YORK, N. Y.

PROCESS OF PRODUCING MILK-POWDER.

SPECIFICATION forming part of Letters Patent No. 723,254, dated March 24, 1903.

Application filed August 11, 1902. Serial No. 119,193. (Specimens.)

*To all whom it may concern:*

Be it known that I, HENRY V. DUNHAM, a citizen of the United States, residing at New York, in the county of New York and State of New York, have invented certain new and useful Improvements in Processes of Producing Milk-Powder, of which the following is a specification, reference being had therein to the accompanying drawings.

In the production of milk-powder many attempts have been made to utilize skimmed as well as whole milk to procure a powder which shall possess the property of dissolving readily in warm water into the original consistency of fresh milk and which shall have the peculiar opacity and qualities of suspension which are characteristic of fresh milk. Milk-powder has been produced by the vacuum-pan process and condensation process to reduce the milk to a dry powder; but the results obtained from this vacuum-pan process have been unsatisfactory, for the reason that the product is an insoluble one, is not held in suspension, and quickly settles when mixed with water, so that it lacks the qualities and opacity of fresh milk. In another process known to me milk-powder has been produced by blowing warm air into the milk until a heavy consistency or thickening of the milk results and then drying out the resulting compound by means of warm air in a series of revolving drums or driers. This process, while superior to the vacuum-pan process mentioned above, is imperfect in results and unsatisfactory because of the fact that it requires a great deal of time, is quite expensive, and the milk-powder produced is more or less insoluble.

The object of my present invention or discovery is the production of a desiccated milk-powder from whole or skimmed milk which is perfectly soluble and which when dissolved in water gives a fluid which is of the opacity and possesses all the qualities of suspension which characterize fresh milk.

In carrying out my process I subject either whole or skimmed milk to the action of heat, preferably by blowing steam through the milk, although other means for heating the milk may be used, if desired, until the temperature is raised to about 200° Fahrenheit, which degree of heat is maintained for from twenty minutes to half an hour. I find that it is preferable to do this heating by blowing the steam through the milk, for the reason that by using steam any disagreeable odors present are driven from the milk and entirely eliminated; but, as noted above, any other suitable heating means may be employed. I have discovered that the milk being in a very dilute solution is but slightly, if at all, affected by this degree of heat, that such high temperature does not coagulate the albumen of the milk and render the product insoluble, and that the milk thus treated is condensed to a marked degree without producing the cooked odor and taste which is characteristic of many of the other milk-powders with which I am familiar. After the milk has been heated, as described above, for about half an hour it is cooled as quickly as possible by running it over refrigerating-pipes, and this cooling step also overcomes in a marked degree the cooked odor and taste resulting from raising the milk to this high temperature. In cooling the milk I preferably reduce the temperature to about 90° Fahrenheit, although it is not absolutely essential that the milk be brought to as low a temperature as this. The milk after being thus cooled is drawn into vacuum-pans and condensed therein at a temperature of about 100° to 110° Fahrenheit to a density of approximately 23° Baumé. When the milk has been condensed to the proper density in the vacuum-pans, it is drawn off and is then mixed with previously-prepared milk-powder or any other suitable absorbent material, so as to take up the moisture in excess in the condensed milk and form a mass, which may then be broken up into small pieces and thoroughly dried by any suitable means. I find that it is preferable to use about equal parts of the milk which is condensed in the vacuum-pan and the milk-powder or other similar soluble absorbent material with which it is mixed to form the mass. After the condensed milk has been thoroughly absorbed by the powder or other absorbent material which is mixed with it the mass is preferably spread upon screens of muslin and subjected to a drying temperature of about 140° Fahrenheit, although any other suitable manner of drying the mass may be adopted. After the product has been thoroughly dried it is removed from the screens or other drying instrumentalities and ground to a very fine powder.

Having thus described my invention or discovery, I claim and desire to secure by Letters Patent—

1. The herein-described steps in the process of producing milk-powder from whole or skimmed milk, consisting in heating the milk to about 200° Fahrenheit, then rapidly cooling it by a refrigerating process, and then condensing it at a temperature of about 110° Fahrenheit, to a density of about 23° Baumé.

2. The herein-described process of producing milk-powder from whole or skimmed milk, consisting in heating the milk to about 200° Fahrenheit, then rapidly cooling it by a refrigerating process, then condensing it at a temperature of about 110° Fahrenheit, to a density of about 23° Baumé, then mixing the condensed product with an absorbent agent to take up excess of moisture, and finally drying the resulting mass and reducing it to powder.

3. The herein-described process of producing milk-powder from whole or skimmed milk, consisting in heating the milk to about 200° Fahrenheit, then rapidly cooling it by a refrigerating process, then condensing it at a temperature of about 110° Fahrenheit, to a density of about 23° Baumé, then mixing the condensed product with approximately equal parts of prepared milk-powder to take up excess of moisture, and finally drying the resulting mass and reducing it to powder.

4. The herein-described process of producing milk-powder from whole or skimmed milk, consisting in blowing steam through the milk to eliminate the odors and raise it to a temperature of about 200° Fahrenheit, then cooling the milk quickly, then condensing it in vacuum-pans at a temperature of about 110° Fahrenheit, to a density of about 23° Baumé, then mixing the condensed product with approximately equal parts of prepared milk-powder to take up excess of moisture, then drying the resulting mass, and finally reducing the product to a fine powder.

In testimony whereof I affix my signature in presence of two witnesses.

HENRY V. DUNHAM.

Witnesses:
S. LISTOE,
JOHANNES D. FÜHRING.